United States Patent
Chae

(10) Patent No.: US 9,924,209 B2
(45) Date of Patent: Mar. 20, 2018

(54) SYSTEM AND METHOD FOR CONTROLLING REPRODUCTION USING TERMINAL

(75) Inventor: Sang Ho Chae, Gyeonggi-Do (KR)

(73) Assignee: SK TECHX CO., LTD., Seoul (KR)

(*) Notice: Subject to any disclaimer, the term of this patent is extended or adjusted under 35 U.S.C. 154(b) by 37 days.

(21) Appl. No.: 13/575,038

(22) PCT Filed: Jan. 5, 2011

(86) PCT No.: PCT/KR2011/000032
§ 371 (c)(1),
(2), (4) Date: Aug. 7, 2012

(87) PCT Pub. No.: WO2011/083951
PCT Pub. Date: Jul. 14, 2011

(65) Prior Publication Data
US 2013/0047183 A1 Feb. 21, 2013

(30) Foreign Application Priority Data
Jan. 8, 2010 (KR) .................. 10-2010-0001742

(51) Int. Cl.
*H04N 21/24* (2011.01)
*H04N 21/239* (2011.01)
(Continued)

(52) U.S. Cl.
CPC ..... *H04N 21/2393* (2013.01); *H04L 65/1059* (2013.01); *H04L 65/4076* (2013.01); *H04L 65/4084* (2013.01); *H04W 4/00* (2013.01)

(58) Field of Classification Search
None
See application file for complete search history.

(56) References Cited

U.S. PATENT DOCUMENTS

| 6,774,926 B1 * | 8/2004 | Ellis | H04N 5/44543 |
| | | | 348/14.01 |
| 7,246,367 B2 * | 7/2007 | Iivonen | 725/102 |

(Continued)

FOREIGN PATENT DOCUMENTS

| KR | 1020030079163 | 10/2003 |
| KR | 10-2006-0069678 | 6/2006 |

(Continued)

*Primary Examiner* — Cai Chen
(74) *Attorney, Agent, or Firm* — Hauptman Ham, LLP

(57) ABSTRACT

Disclosed are a system and a method for minimizing signal interference for a broadcasting and communication convergence section within a local area, and an apparatus applied to the same. The system has a construction of mounting a plurality of multi RF (Radio Frequency) channels within a short-range wireless transmitting apparatus located in a local area and minimizing signal interference between mutually adjacent RF channels within the short-range wireless transmitting apparatus in a standard for providing a broadcasting and communication convergence service. Accordingly, it is possible to remove the mutual channel effects affecting a communication signal without signal interference for adjacent channels due to a broadcasting signal and it is not necessary to enhance a filtering characteristic for the adjacent channels of a chipset, which corresponds to a broadcasting and communication convergence standard structure in a local area, so that there is an advantage of reducing network investment costs.

4 Claims, 9 Drawing Sheets

(51) Int. Cl.
*H04L 29/06* (2006.01)
*H04W 4/00* (2018.01)

(56) References Cited

U.S. PATENT DOCUMENTS

| | | | |
|---|---|---|---|
| 7,522,675 B2* | 4/2009 | Sheynman | G06F 21/10 375/295 |
| 2002/0067909 A1* | 6/2002 | Iivonen | H04N 7/165 386/275 |
| 2006/0112325 A1* | 5/2006 | Ducheneaut | H04L 12/1822 715/203 |
| 2006/0136753 A1* | 6/2006 | Chen | G06F 1/26 713/300 |

FOREIGN PATENT DOCUMENTS

| | | |
|---|---|---|
| KR | 1020060068142 | 6/2006 |
| KR | 10-2007-0001482 | 1/2007 |
| KR | 10-2008-0043493 | 5/2008 |
| KR | 10-0837777 | 6/2008 |
| KR | 10-2009-0017795 | 2/2009 |
| KR | 1020090064559 | 6/2009 |

* cited by examiner

SYSTEM AND METHOD FOR CONTROLLING REPRODUCTION USING TERMINAL

1. FIELD OF THE INVENTION

The present invention relates to a system for controlling a reproduction using a terminal, and more particularly to a system and a method for controlling a reproduction operation of a reproduction apparatus for reproducing multimedia contents, that is, a reproduction operation of a first terminal by using a second terminal having a communication interface.

2. DESCRIPTION OF THE PRIOR ART

In general, a reproduction apparatus reproducing multimedia contents provided through various paths such as an IPTV (Internet Protocol TV), a PC TV-out, and an Internet TV can reproduce/broadcast desired multimedia contents or use a new service employing a bidirectional service in broadcasting. Of course, such a reproduction apparatus is operated according to a control by a user when the reproduction apparatus receives/reproduces multimedia contents transmitted over an IP based network.

Accordingly, in the conventional art, a viewer watching multimedia contents reproduced through the reproduction apparatus is located in a position having a predetermined distance from the reproduction apparatus and the viewer generally inputs a control through a remote control.

However, a conventional remote control has a limitation in controlling a reproduction operation of the reproduction apparatus because the conventional remote control receives an input of a control by a user mainly through a plurality of buttons and then provides a controlled control signal to the reproduction apparatus by using an infrared ray.

Further, when many viewers watch multimedia contents reproduced in the reproduction apparatus, the viewers feel uncomfortable because they are disturbed by various bidirectional services and additional services displayed in the reproduction apparatus reproducing the multimedia contents during watching the multimedia contents.

SUMMARY OF THE INVENTION

Accordingly, the present invention has been made to solve the above-mentioned problems occurring in the prior art, and an aspect of the present invention provides a system and a method for controlling a reproduction operation of a reproduction apparatus reproducing multimedia contents such that the reproduction operation of the multimedia contents is synchronized with a terminal having a communication interface.

In accordance with an aspect of the present invention, there is provided system for controlling a reproduction using a terminal, the system comprising: a first terminal for controlling predetermined multimedia contents according to a predetermined control signal; a second terminal for transmitting the control signal according to a user's manipulation through a guide menu related to a reproduction operation of the multimedia contents, the second terminal being synchronized with the reproduction operation of the multimedia contents in the first terminal; and a content service server for providing the first terminal with at least one of the multimedia contents and the control signal transmitted from the second terminal.

In accordance with another aspect of the present invention, there is provided a terminal including a communication unit for supporting data communication; a content reproduction unit for reproducing multimedia contents provided through the communication unit; and an controller for controlling a reproduction operation of the content reproduction unit according to a predetermined control signal from an outside.

The terminal may further include a short range communication unit for supporting short range communication with an apparatus located within a predetermined range, wherein the controller controls the reproduction operation of the content reproduction unit according to the control signal received through the short range communication unit.

The controller may control the reproduction operation of the content reproduction unit according to the control signal received through the communication unit or the control signal included in the multimedia contents provided through the communication unit.

In accordance with another aspect of the present invention, there is provided a terminal including a user interface unit for receiving an input of a manipulation by a user; and a control function unit for displaying a guide menu related to a reproduction operation of multimedia contents in synchronization with the reproduction operation of the multimedia contents in an external first terminal and transmitting a control signal for the first terminal according to the manipulation by the user input through the user interface unit.

The terminal may further include a short range communication unit for supporting short range communication with an apparatus located within a predetermined range, wherein the control function unit provides the first terminal connected through the short range communication unit with the control signal.

The control function unit may request a control for the first terminal to the first terminal when the connection with the first terminal is implemented through the short range communication unit, receive synchronization information corresponding to the reproduction operation of the multimedia contents reproduced in the first terminal from the first terminal, receive guide information corresponding to the reproduction operation of the multimedia contents reproduced in the first terminal from the first terminal or a predetermined external content service server, and display the guide menu corresponding to the reproduction operation of the multimedia contents in synchronization with the reproduction operation of the multimedia contents in the first terminal based on the guide information and the synchronization information when a remote control mode is selected according to the manipulation by the user.

The control function unit may request a control for the predetermined first terminal to a predetermined external content service server, receive synchronization information and guide information corresponding to the reproduction operation of the multimedia contents in the first terminal from the content service server, and display the guide menu corresponding to the reproduction operation of the multimedia contents in synchronization with the reproduction operation of the multimedia contents in the first terminal based on the guide information and the synchronization information when a remote control mode is selected according to the manipulation by the user.

When a predetermined bidirectional service function is selected according to the manipulation by the user, the control function unit may receive and display bidirectional data generated through the bidirectional service function from a corresponding content service server in relation to the multimedia contents reproduced in the first terminal or provide the corresponding content service server with input information according to the manipulation by the user through the bidirectional service function.

In accordance with another aspect of the present invention, there is provided a content service server comprising: a content provision manager for providing a predetermined external first terminal with at least one of multimedia contents; and a bidirectional service manager for, when a predetermined bidirectional service function corresponding to the multimedia contents reproduced in the first terminal is requested from a predetermined external second terminal, providing the second terminal with corresponding bidirectional data generated by the bidirectional service function.

When predetermined input information according to the bidirectional service function is provided from the second terminal, the bidirectional service manager may process a corresponding service according to the bidirectional service function based on the input information.

The content service server may further comprise a control interworking unit for, when a control signal corresponding to the predetermined first terminal is provided from the predetermined external second terminal, providing the first terminal with the control signal.

When a control for a predetermined first terminal is requested from the predetermined second terminal, the control interworking unit may provide the second terminal with at least one of guide information and synchronization information corresponding to the reproduction operation of the multimedia contents in the first terminal.

In accordance with another aspect of the present invention, there is provided a method of controlling a reproduction using a terminal, the method comprising: reproducing multimedia contents by a first terminal; connecting the first terminal to a second terminal, displaying a guide menu related to a reproduction operation of the multimedia contents in synchronization with the reproduction operation of the multimedia contents in the first terminal by the second terminal, and providing the first terminal with a control signal for the reproduction operation through the guide menu by the second terminal; and controlling the reproduction operation according to the control signal by the first terminal.

In accordance with another aspect of the present invention, there is provided a reproducing method of a terminal, comprising: reproducing contents for reproducing multimedia contents; and controlling the terminal for controlling a reproduction operation in reproducing the contents according to a predetermined control signal, wherein, in controlling the terminal, the reproduction operation in reproducing the contents is controlled according to the control signal received through short range communication or the reproduction operation in reproducing the contents is controlled according to the control signal included in the multimedia contents.

In accordance with another aspect of the present invention, there is provided a method of controlling a terminal, comprising: requesting a control for a predetermined first terminal; and performing a control function for displaying a guide menu corresponding to a reproduction operation of multimedia contents in synchronization with the reproduction operation of the multimedia contents in the first terminal and for transmitting a control signal corresponding to the first terminal according to a manipulation by a user.

The step of requesting of the control may comprise requesting synchronization information corresponding to the reproduction operation of the multimedia contents in the first terminal to the first terminal; receiving the synchronization information from the first terminal; and receiving guide information corresponding to the reproduction operation of the multimedia contents in the first terminal from the first terminal or a predetermined external content service server.

The step of requesting of the control may comprise requesting a control for the first terminal to a predetermined external content service server; and receiving synchronization information and guide information corresponding to the reproduction operation of the multimedia contents in the first terminal from the content service server.

When a predetermined bidirectional service function is selected, the method may further comprise requesting bidirectional data generated through the bidirectional service function in response to the multimedia contents reproduced in the first terminal to a corresponding content service server and receiving/displaying the requested bidirectional data; and providing the corresponding content service server with input information input through the bidirectional service function.

In accordance with another aspect of the present invention, there is provided a service method of a content service server, the method comprising: providing contents for providing a predetermined external first terminal with at least one of multimedia contents; and when a predetermined bidirectional service function related to the multimedia contents reproduced in the first terminal is requested from a predetermined external second terminal, providing a bidirectional service for providing the second terminal with bidirectional data generated through the bidirectional service function in response to the multimedia contents.

In the step of providing of the bidirectional service, when predetermined input information according to the bidirectional service function is provided from the second terminal, a corresponding service according to the bidirectional service function is processed based on the input information.

The method may further comprise, when a control signal corresponding to a predetermined first terminal is provided from the predetermined external second terminal, performing a control interworking for providing the first terminal with the control signal.

The step of performing a control interworking may comprise providing the second terminal with at least one of synchronization information and guide information corresponding to the reproduction operation of the multimedia contents in the first terminal, when a control for the predetermined first terminal is requested from the predetermined second terminal.

According to the system and the method for controlling the reproduction using the terminal, the reproduction operation of a first terminal reproducing multimedia contents may be controlled using a second terminal having a communication interface by providing the first terminal with a control signal from the second terminal through a content service server or directly providing the first terminal with a control signal from the second terminal through short range communication.

According to the system and the method for controlling the reproduction using the terminal, various bidirectional services and additional services corresponding to multimedia contents reproduced in the first terminal may also be provided to users by using the second terminal.

Therefore, according to the system and the method for controlling the reproduction using the terminal, it is possible to overcome a limitation in using a general TV remote control to provide an optimum control service and prevent a user's viewing from being interrupted by displays of a bidirectional service and an additional service in the reproduction apparatus, that is, the first terminal by controlling the reproduction operation of the first terminal and supporting the bidirectional service by using the second terminal having the communication interface.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, an exemplary embodiment of the present invention will be described with reference to the accompanying drawings.

Figure 1:
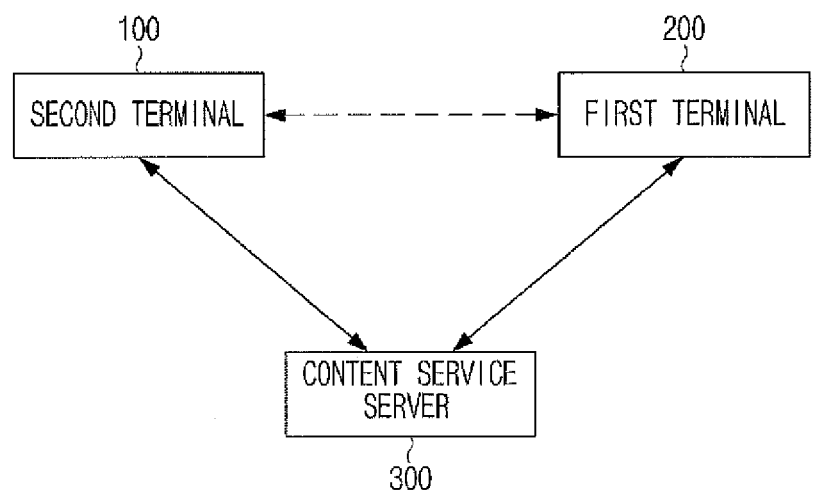
FIG. 1 illustrates a reproduction control system using a terminal according to exemplary embodiments of the present invention.

FIG. 1 illustrates a reproduction control system using a terminal according to exemplary embodiments of the present invention.

As shown in FIG. 1, the reproduction control system using the terminal according to the present invention includes a first terminal 200 for controlling a predetermined multimedia content according to a predetermined control signal, a second terminal for transmitting the control signal according to a user's control through a guide menu corresponding to a reproduction operation of the multimedia content, the second terminal being synchronized with the reproduction operation of the multimedia content, and a content service server 300 for providing at least one of the multimedia content and the control signals transmitted from the second terminal 100.

The first terminal 200 reproduces multimedia contents (e.g. real-time broadcasting contents, VOD contents, etc.) provided from the outside, especially from the content service server 300. It is preferable that the first terminal 200 is a reproduction apparatus having a construction capable of reproducing multimedia contents provided through various paths such as an IPTV (Internet Protocol TV), a PC TV-out, and an Internet TV.

Also, the first terminal 200 controls a reproduction operation of the multimedia content according to a predetermined control signal from the outside.

The first terminal 200 includes a display unit for displaying multimedia contents and can be an apparatus enabling the display unit to display the multimedia contents according to the reproduction operation. Alternatively, the first terminal 200 is connected to a separate display device and provides multimedia contents according to the reproduction operation to the display device, and thus can be an apparatus enabling the display device to display the multimedia contents.

The second terminal 100 is synchronized with the reproduction operation of the multimedia contents in the first terminal 200 through short range communication with the first terminal 200 or interworking with the content service server 300, and transmits a control signal corresponding to the first terminal 200 according to a user's control through a display/guide menu corresponding to the reproduction operation of the multimedia contents in the first terminal 200. The second terminal 100 may include a movable mobile terminal which is portable and has a mobile communication function and/or a mobile Internet function.

The content service server 300 provides at least one of the multimedia contents to the predetermined external first terminal 200. The content service server 300 can provide a control signal, which corresponds to the first terminal 200, transmitted from the second terminal 100 to the corresponding first terminal 200.

Then, the first terminal 200 can control a reproduction operation of the multimedia contents according to the control signal from the second terminal 100 according to the control signal provided from the second terminal 100 through the short range communication or the control signal transmitted from the first terminal 100 and provided from the content service server 300.

Hereinafter, a construction of the terminal according to the present invention will be described in detail with reference to FIG. 2 and, especially, the second terminal 200 of FIG. 2 will be described for the convenience of descriptions.

The first terminal 200 includes a communication unit 210 for supporting data communication, a content reproduction unit 220 for reproducing multimedia contents provided through the communication unit 210, and an controller 230 for controlling a reproduction operation of the content reproduction unit 220 according to a predetermined control signal from the outside.

The communication unit 210 performs a communication function supporting the data communication. That is, multimedia contents (e.g. real-time broadcasting contents, VOD contents, etc.) provided from the content service server 300 may be received through the communication unit 210 and other various signals may be received. Here, the communication unit 210 supplies IP based communication to receive IP based multimedia contents (e.g. real-time broadcasting contents, VOD contents, etc.) and can receive other various IP based signals.

The content reproduction unit 220 reproduces multimedia contents provided through the communication unit 210. It is preferable that the content reproduction unit 220 stores guide information contained in the multimedia contents.

The controller 230 controls a reproduction operation of the content reproduction unit 220 according to a control signal from the outside.

Figure 2:
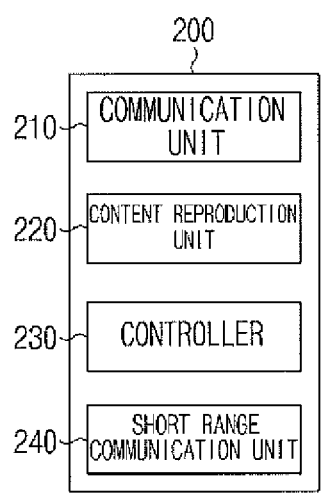
FIG. 2 is a block diagram illustrating a first terminal according to exemplary embodiments of the present invention.

Here, the first terminal 200 according to the present invention may further include a short range communication unit 240 as shown in FIG. 2.

The short range communication unit 240 supplies short range communication with an apparatus (e.g. the second terminal 100) located within a predetermined range. The short range communication unit 240 may include at least one of Bluetooth and Wi-Fi.

When there is a request for a control attempt from the second terminal 100 connected with the first terminal 200 through the short range communication unit 240, the controller 230 can provide the second terminal 100 with guide information and synchronization information corresponding to the reproduction operation of the multimedia contents in the first terminal 200, that is, the reproduction operation of the multimedia contents (e.g. real-time broadcasting contents, VOD contents, etc.) in the content reproduction unit 220 through the short range communication unit 240.

Here, when the first terminal 200 reproduces real-time broadcasting contents, the synchronization information may contain current broadcasting channel information, information on real-time broadcasting contents which are being reproduced, and reproduction volume information. When the first terminal 200 reproduces VOD contents, the synchronization information may contain information on VOD contents which are being reproduced, reproduction section information, and reproduction volume information. As a result, the synchronization information may contain various information pieces required for synchronizing the second terminal 100 with the reproduction operation of the first terminal 200.

Further, the controller 230 can control the reproduction operation of the content reproduction unit 220 according to a control signal received from the second terminal 100 through the short range communication unit 240.

Meanwhile, the controller 230 in the first terminal 200 according to the present invention can control the reproduction operation of the content reproduction unit 220 according to a control signal provided/received from the content service server 300 through the communication unit 210.

Alternatively, the controller 230 extracts/recognizes a control signal included in the multimedia contents provided/received from the content service server 300 through the communication unit 210 and can control the reproduction operation of the content reproduction unit 220 according to the recognized control signal.

Then, the content reproduction unit 220 performs the reproduction operation such as changing a broadcasting channel, adjusting a reproduction volume up/down, reproducing a particular VOD content (e.g. movie 1), moving a reproduction section of the VOD content (e.g. movie 1) which is being reproduced, or downloading a particular VOD content (e.g. movie 2) according to a control by the controller 230 based on the control signal.

Hereinafter, the terminal according to the present invention will be described in detail with reference to FIG. 3 and, especially, the second terminal 100 of FIG. 1 will be described for the convenience of descriptions.

The second terminal 100 according to the present invention includes a communication interface unit 110, a user manipulator 130 for receiving an input from a user and a control function unit 120 for displaying a guide menu corresponding to a reproduction operation of multimedia contents and transmitting a control signal corresponding to the first terminal 200 according to a user's manipulation through the user manipulator 130, the control function unit 120 being synchronized with the reproduction operation of the multimedia contents in the predetermined first terminal 200.

The communication interface unit 110 refers to a communication unit supporting a mobile communication function and/or a mobile Internet function.

The user manipulator 130 refers to a function unit receiving an input of a manipulation from the user of the second terminal 100 and may include a plurality of buttons, especially a touch screen. When the user manipulator 130 includes the touch screen, the second terminal 100 may be a second mobile terminal with a touch screen UI on a screen displaying an image having a touch function.

The control function unit 120 is synchronized with the reproduction operation of the multimedia contents in the first terminal 200, displays the guide menu corresponding to the reproduction operation of the multimedia contents, and transmits the control signal corresponding to the first terminal 200 according to the user's manipulation through the user manipulator 130.

Figure 3:
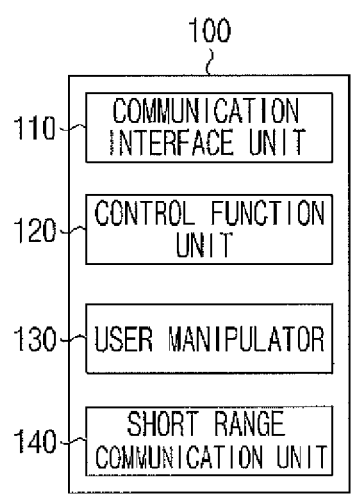
FIG. 3 is a block diagram illustrating a second terminal according to exemplary embodiments of the present invention

More specifically, the second terminal 100 according to the present invention may further include the short range communication unit 140 as shown in FIG. 3.

The short range communication unit 140 supplies short range communication with an apparatus (e.g. the first terminal 200) located within a predetermined range. The short range communication unit 140 can include at least one of Bluetooth and Wi-Fi.

Then, the control function unit 120 is connected with the first terminal 200 through the short range communication unit 140, and makes a request for a control attempt to the first terminal 200 when the control attempt for the first terminal 200 is input from the user through the user manipulator 130.

The control function unit 120 receives synchronization information corresponding to the reproduction operation of the multimedia contents in the first terminal 200 from the first terminal 200 through the short range communication unit 140 and receives guide information corresponding to the reproduction operation of the multimedia contents in the first terminal 200 from the first terminal 200 or the predetermined external content service server 300. Further, the control function unit 120 is synchronized with the reproduction operation of the multimedia contents in the first terminal 200 based on the synchronization information, and can display the guide menu corresponding to the reproduction operation of the multimedia contents based on the guide information when a remote control mode is selected according to a user's manipulation.

Here, when the first terminal 200 reproduces real-time broadcasting contents, the received synchronization information may contain current broadcasting channel information, information on real-time broadcasting contents which are being reproduced, and reproduction volume information. When the first terminal 200 reproduces VOD contents, the synchronization information may contain information on VOD contents which are being reproduced, reproduction section information, and reproduction volume information. As a result, the synchronization information may contain various information pieces required for synchronizing the second terminal 100 with the reproduction operation of the first terminal 200.

The received guide information contains EPG (Electronic Program Guide) information including broadcasting information on real-time broadcasting contents for each channel/time for the real-time broadcasting, information on various additional services, and detailed information on each real-time broadcasting content, information on lists of recommended contents, and detailed information on VOD contents including information on lists of VOD contents, thumbnail information for each VOD content, and popular area information. As a result, the guide information may contain various information pieces required for displaying the guide menu corresponding to the reproduction operation in the first terminal 200 by the second terminal 100.

The control function unit 120 can display the guide menu corresponding to the reproduction operation of the multimedia contents in the first terminal 200 based on the guide information when a remote control mode is selected according to a user's manipulation.

For example, when the remote control mode is selected, if the first terminal 200 reproduces the real-time broadcasting contents, the control function unit 120 displays an EPG screen for identifying the real-time broadcasting contents and a broadcasting channel which are currently being reproduced in the first terminal 200 as the guide menu based on the guide information, and can display detailed information on particular real-time broadcasting contents as the guide menu by converting the EPG screen according to the user's manipulation or display lists of recommended contents as the guide menu. Of course, it is preferable that the guide menu contains displayed items for changing the broadcasting channel or adjusting the reproduction volume up/down.

Further, when the remote control mode is selected, if the first terminal 200 reproduces the VOD contents, the control function unit 120 displays a detailed screen for the VOD contents including a thumbnail for the VOD contents which are being reproduced in the first terminal 200, a popular area, control items of reproduction/pause/stop/rewind, and a progress bar for moving a reproduction section as the guide menu based on the guide information, and can display lists of the VOD contents as the guide menu by changing the detailed screen for the VOD contents according to the user's manipulation, display the detailed information on the VOD contents as the guide menu, or display the EPG screen as the guide menu.

As described above, when the user recognizing the displayed guide menu inputs a manipulation in the user manipulator 130, the control function unit 120 can provide the first terminal 200 with a control signal corresponding to the first terminal 200 according to the user's manipulation through the short range communication unit 140.

For example, when a conversion of the broadcasting channel is selected in the guide menu (e.g. EPG screen), the control function unit 120 can provide a control signal for making a request for the conversion to the selected broadcasting channel corresponding to the first terminal 200. When a movement of the reproduction section is selected in the guide menu (e.g. detailed screen of VOD), the control function unit 120 can provide a control signal for making a request for the movement to the selected reproduction section corresponding to the first terminal 200.

The control signal provided by the control function unit 120 is to be provided to the first terminal through the short range communication unit 140.

Meanwhile, when an attempt at controlling the first terminal 200 is input from the user through the user manipulator 130, the control function unit 120 in the second terminal 100 can make a request for the attempt at controlling the first terminal 200 to the external content service server 300 through the communication interface unit 110.

When the synchronization information and the guide information corresponding to the reproduction operation of the multimedia contents in the first terminal 200 are received from the content service server 300 in response to the request for the control attempt, the control function unit 120 is synchronized with the reproduction operation of the multimedia contents in the first terminal 200 based on the synchronization information. Further, when the remote control mode is selected according to the user's manipulation, the control function unit 120 can display the guide menu corresponding to the reproduction operation of the multimedia contents in the first terminal 200 based on the guide information.

Then, the control function unit 120 can display the aforementioned guide menu (e.g. EPG screen, detailed screen of VOD).

Further, when the user recognizing the displayed guide menu inputs a manipulation in the user manipulator 130, the control function unit 120 will provide the content service server 300 with a control signal corresponding to the first terminal 200 according to the user's manipulation through the communication interface unit 110.

Then, the control signal provided by the control function unit 120 is provided to the content service server 300 through the communication interface unit 110 and the content service server 300 will provide the control signal, which corresponds to the first terminal, transmitted from the second terminal 100 to the corresponding first terminal 200 as described above.

Meanwhile, when a predetermined bidirectional service function is selected according to the user's manipulation through the user manipulator 130, the control function unit 120 can request bidirectional data according to the selected bidirectional service function (e.g. viewing a review, viewing an advertisement, ordering an advertised product, etc.) corresponding to the multimedia contents (e.g. real-time broadcasting contents or VOD contents) reproduced in the first terminal 200 to the content service server 300 and receive/display the requested bidirectional data.

That is, when a predetermined bidirectional service function (e.g. viewing a watching review) is selected, the control function unit 120 requests bidirectional data according to the bidirectional service function (e.g. viewing a review) corresponding to the multimedia contents (e.g. real-time broadcasting contents-sports broadcasting) reproduced in the first terminal 200 to the corresponding content service server 300 and can accordingly display information on the review received from the content service server 300 through the communication interface unit 110. The user of the second terminal 100 can identify other viewers' opinions by viewing the review written by other viewers for the sports broadcasting reproduced in the first terminal through the second terminal 100.

Further, the control function unit 120 provides input information input according to the user's manipulation to the corresponding content service server 300 through the predetermined bidirectional function.

That is, when the predetermined bidirectional service function (e.g. writing a review) is selected, the control function unit 120 receives an input of input information (e.g. a review) from the user through the bidirectional service function (e.g. writing a review) corresponding to the multimedia contents (e.g. real-time broadcasting contents-sports broadcasting) reproduced in the first terminal 200 and can provide the input information (e.g. a review) to the content service server 300 through the communication interface unit 110.

Hereinafter, a construction of the content service server 300 according to the present invention will be described in detail with reference to FIG. 4.

The content service server 300 according to the present invention includes a content provision manager 310 for providing at least one multimedia content to the predetermined external first terminal 200 and a bidirectional service manager 320 for providing corresponding bidirectional data according to a request for a bidirectional function to the second terminal 100 when the predetermined external first terminal 200 makes the request for the bidirectional function corresponding to the multimedia contents reproduced in the first terminal 200.

The content provision manager 310 provides at least one of the multimedia contents (e.g. real-time broadcasting contents or VOD contents) for a service to the first terminal 200. It is preferable that the content provision manager 310 provides guide information corresponding to the multimedia contents as well in providing the multimedia content.

Here, the guide information contains EPG (Electronic Program Guide) information including broadcasting information on real-time broadcasting contents for each channel/time for the real-time broadcasting, information on various additional services, and detailed information on each real-time broadcasting content, information on lists of recommended contents, and detailed information on VOD contents including information on lists of VOD contents, thumbnail information for each VOD content, and popular area information. As a result, the guide information may contain various information pieces required for displaying the guide menu corresponding to the reproduction operation in the first terminal 200 by the second terminal 100.

When the second terminal 100 makes a request for a predetermined bidirectional service function corresponding to the multimedia contents reproduced in the first terminal 200, the bidirectional service manager 320 provides corresponding bidirectional data according to the request for the bidirectional service function to the second terminal 100.

Specifically, the bidirectional service manager 320 can store/manage bidirectional data including at least one content meta information containing at least one information related to corresponding multimedia contents and information on pre-written reviews and detailed meta information containing at least one of advertisement information for each section or each scene of corresponding multimedia contents and information on reviews in response to each of at least one multimedia content provided by the content provision manager 310.

When the second terminal 100 makes a request for the bidirectional service function (e.g. viewing a review, viewing an advertisement, ordering an advertised product, etc.) corresponding to the multimedia contents (e.g. real-time broadcasting contents or VOD contents) reproduced in the first terminal 200, the bidirectional service manager 320 provides bidirectional data (e.g. advertisement information) corresponding to corresponding multimedia contents (e.g. real-time broadcasting contents) according to the requested bidirectional service function (e.g. viewing an advertisement) to the second terminal 100. Of course, the bidirectional service manager 320 can also provide the bidirectional data (e.g. advertisement information) corresponding to the corresponding multimedia contents (e.g. real-time broadcasting contents) according to the request of the bidirectional service function (e.g. viewing an advertisement) to the first terminal 200.

Further, when the second terminal 100 provides predetermined input information (e.g. a review) according to a predetermined bidirectional service function (e.g. writing a review), the bidirectional service manager 320 processes the corresponding service according to the corresponding bidirectional service function (e.g. writing a review) based on the input information (e.g. a review) in response to the multimedia contents (e.g. real-time broadcasting contents-sports broadcasting) reproduced in the first terminal 200. That is, the bidirectional service manager 320 enables other viewers to identify opinions written by users of the second terminal 100 for the corresponding sports broadcasting by registering the reviews provided from the second terminal 100 in the bidirectional data (content meta information and/or detailed meta information) corresponding to the corresponding multimedia contents (e.g. real-time broadcasting contents-sports broadcasting).

Figure 4:
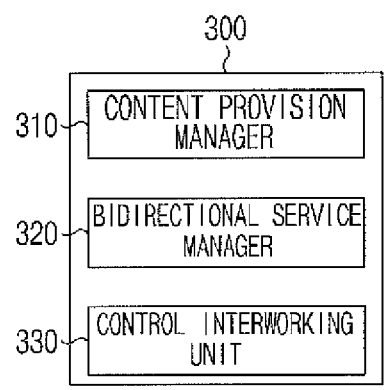
FIG. 4 is a block diagram illustrating a content service server according to exemplary embodiments of the present invention.

Meanwhile, the content service server 300 according to the present invention may further include a control interworking unit 330 as shown in FIG. 4.

When the predetermined second terminal 100 makes a request for an attempt at controlling the predetermined first terminal 200, the control interworking unit 330 provides the second terminal 100 with synchronization information and guide information corresponding to the reproduction operation of the multimedia contents in the first terminal 200.

That is, when the second terminal 100 makes the request for the attempt at controlling the first terminal 200, the control interworking unit 330 is interworked with the content provision manager 310 providing the multimedia contents to the first terminal 200 to acquire the guide information and communicates with the first terminal 200, especially with the controller 230 to acquire the synchronization information of the first terminal 200. Accordingly, the control interworking unit 330 can provide the second terminal 100 with the synchronization information and the guide information corresponding to the reproduction operation of the multimedia contents in the first terminal 200.

Further, when the second terminal 100 provides a control signal corresponding to the first terminal 200, the control interworking unit 330 provides the second terminal 100 with the corresponding control signal.

At this time, when the second terminal 100 provides a control signal corresponding to the first terminal 200, the control interworking unit 330 transfers the corresponding control signal to the content provision manager 310 so that the content provision manager 310 can provide multimedia contents including the control signal when the content provision manager 310 provides the first terminal 200 with the multimedia contents.

The content provision manager 310 is provided as a separate content provision server providing a broadcasting service and/or a VOD service and the bidirectional service manager 320 is provided as a bidirectional service server managing bidirectional data and providing a bidirectional service. The control interworking unit 330 is separately provided as an interworking server interworks between the first terminal 200 and the second terminal 100 to support them and can play a role of the aforementioned content service server 300 through the mutual interworking between the first terminal 200 and the second terminal 100.

As described above, the reproduction control system using the terminal according to the present invention provides the first terminal 200 with the control signal from the second terminal 100 through the content service server 300 or directly provides the first terminal 200 with the control signal from the second terminal 100 through short range communication so that the reproduction control system can control the reproduction operation of the first terminal 200 reproducing the multimedia contents by using the second terminal 100 having the communication interface.

Further, the reproduction control system using the terminal according to the present invention can provide users with various bidirectional services and additional services corresponding to the multimedia contents reproduced in the first terminal 200 by using the second terminal 100.

Accordingly, the reproduction control system using the terminal according to the present invention can overcome a limitation in using a general TV remote control so as to provide an optimum control service and can prevent the user's viewing from being interrupted by displays of a bidirectional service and an additional service in the reproduction apparatus, that is, the first terminal 200, by controlling the reproduction operation and supporting the bidirectional service by using the second terminal 100 having the communication interface. Here, when it is considered that the second terminal 100, which controls the reproduction operation of the reproduction apparatus, that is, the first terminal 200 and supplies the bidirectional service, is a mobile terminal, it is possible to better maximize the effects of overcoming the limitation in using the TV remote control, providing the optimum control service, and preventing the user's viewing from being interrupted by the displays of the bidirectional service and additional service.

Hereinafter, a method of controlling a reproduction using the terminal according to exemplary embodiments of the present invention will be described with reference to FIGS. 5 to 9. Here, reference numerals used in the constructions shown in FIGS. 1 to 4 will be also used for convenience of descriptions.

Figure 5:
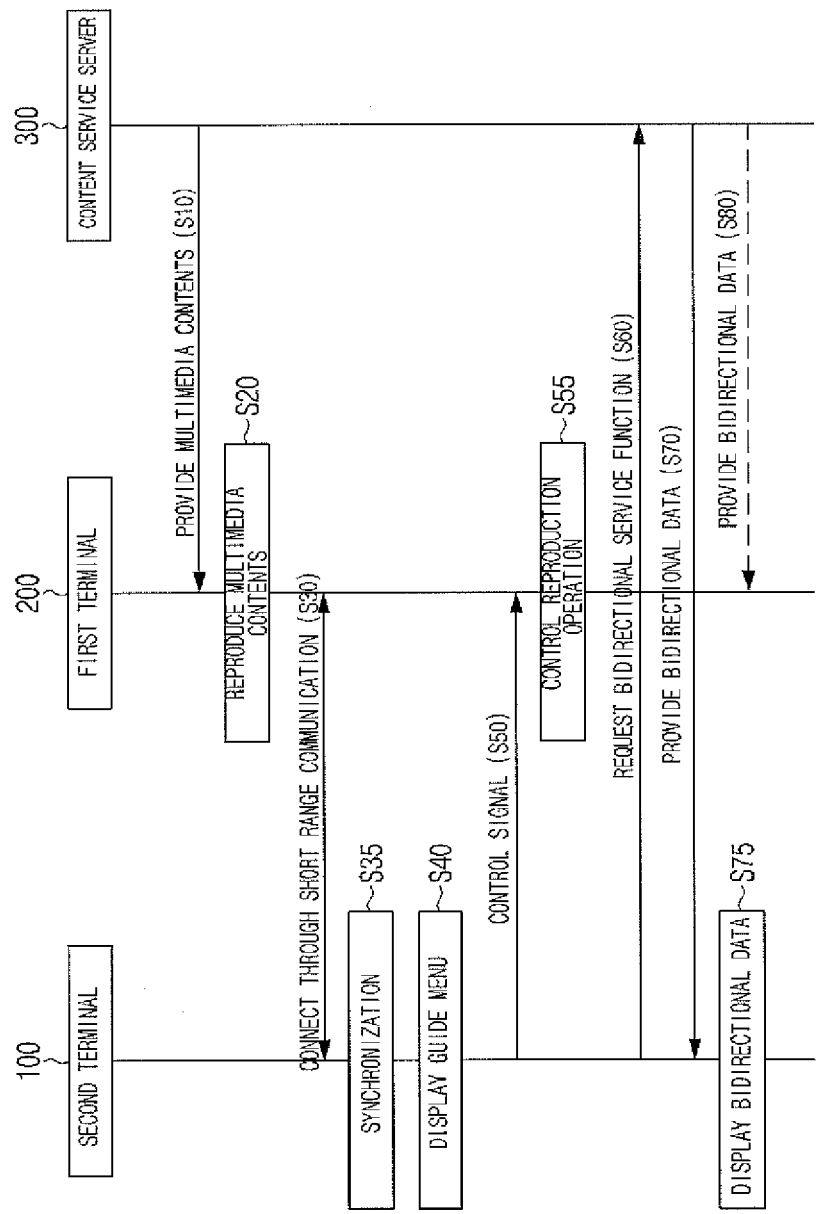
FIG. 5 is a flowchart illustrating a flow of a reproduction control method using a terminal according to exemplary embodiments of the present invention.

First, a total control flow of the method of controlling the reproduction using the terminal according to exemplary embodiments of the present invention will be described with reference to FIG. 5.

The first terminal 200 receives predetermined multimedia contents from the content service server 300 in step S10 and reproduces the corresponding multimedia contents in step S20.

Meanwhile, the second terminal 100 is connected to the first terminal 200 through short range communication by a user who desires to control the first terminal 200 in step S30.

When the user inputs an attempt at controlling the first terminal 200 in the second terminal 100, the second terminal 100 makes a request for the control attempt from the first terminal 200, and accordingly the second terminal is synchronized with the reproduction operation of the multimedia contents in the first terminal 200 in step S35 and displays a guide menu corresponding to the reproduction operation of the multimedia contents in step S40.

Then, the second terminal 200 provides the first terminal 200 with a control signal according to a user's manipulation through the guide menu in step S50.

The first terminal 200 controls the reproduction operation of the multimedia contents according to the control signal provided from the second terminal 100 through short range communication in step S55.

Meanwhile, when a predetermined bidirectional service function is selected according to a user's manipulation, the second terminal 100 makes a request for the selected bidirectional service function (e.g. viewing an advertisement) corresponding to the multimedia contents reproduced in the first terminal 200 in step S60 and provides the second terminal 100 with bidirectional data (e.g. advertisement information) according to the requested bidirectional service function in step S70. Of course, the content service server 300 can also provide the first terminal 200 with the bidirectional data (e.g. viewing an advertisement) according to the requested bidirectional service function.

Then, the second terminal 100 can display the provided bidirectional data (e.g. advertisement information) to provide the user with the displayed bidirectional data in step S75.

Figure 6:
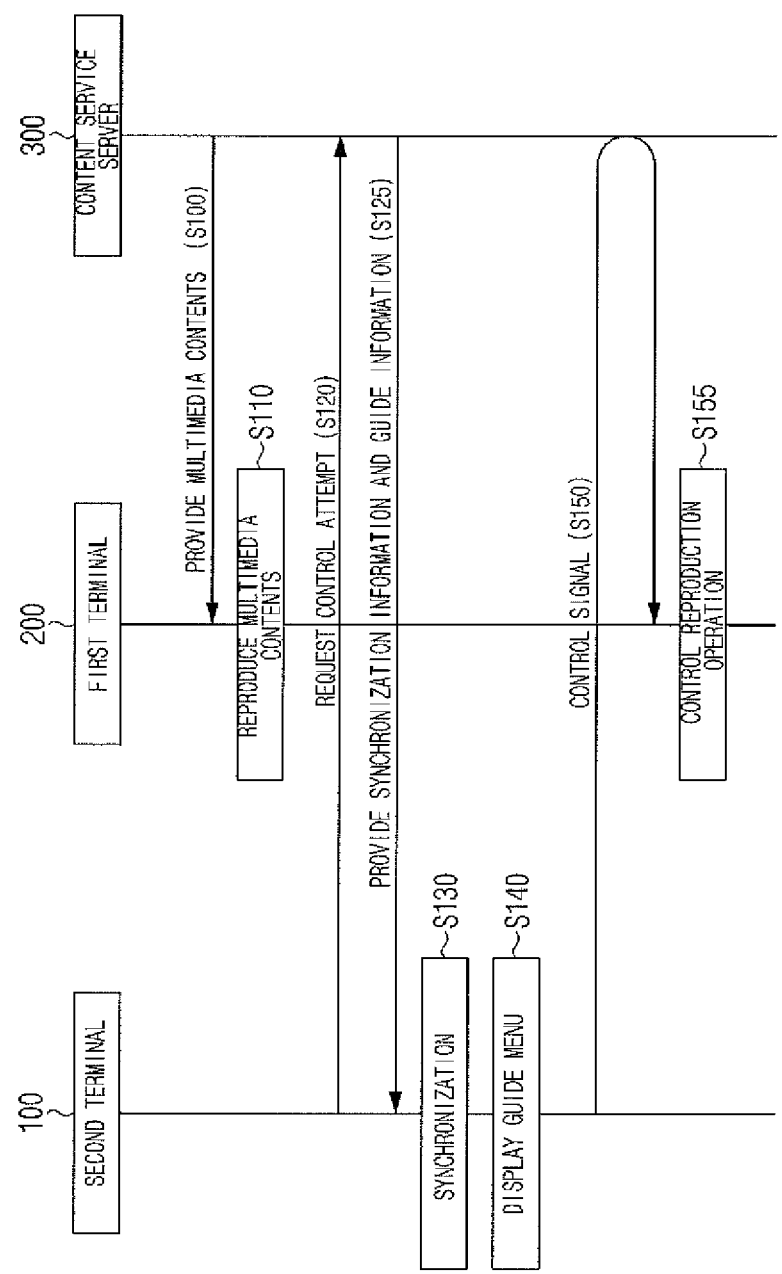
FIG. 6 is a flowchart illustrating a flow of a reproduction control method using another terminal according to exemplary embodiments of the present invention.

Meanwhile, hereinafter, a method of controlling the reproduction using the terminal according to another embodiment of the present invention will be described with reference to FIG. 6.

The first terminal 200 receives predetermined multimedia contents from the content service server 300 and reproduces the corresponding multimedia contents in step S110.

Meanwhile, when the user inputs a control attempt for the first terminal 200 in the second terminal 100, the second terminal 100 requests the control attempt for the first terminal 200 to the content service server 300 in step S120.

Accordingly, the second terminal 100 receives synchronization information and guide information corresponding to the first terminal 200 from the content service server 300 in step S125. Further, the second terminal 100 is synchronized with the reproduction operation of the multimedia contents in the first terminal 200 based on the received information in step S130 and displays a guide menu corresponding to the reproduction operation of the multimedia contents in step S140.

Then, the second terminal 100 provides the content service server 300 with a control signal corresponding to the first terminal 200 according to a user's manipulation through the guide menu, so that the control signal may be provided to the first terminal 200 in step S150.

The first terminal 200 controls the reproduction operation of the multimedia contents according to the control signal, which is transmitted to the content service server 300 from the second terminal 100 and then provided by the content service server 300 in step S155.

Meanwhile, steps S60 to S80 described in FIG. 5 may be identically applied to the embodiment of the present invention described with reference to FIG. 6, so a detailed description will be omitted.

Hereinafter, a reproducing method of the terminal according to the present invention will be described with reference to FIG. 7 and, especially the first terminal 200 will be described for the convenience of descriptions.

In the reproducing method of the first terminal 200 according to the present invention, the multimedia contents are reproduced in step S200. At this time, it is preferable that guide information included in the corresponding multimedia contents provided from the outside is stored in the reproducing method of the first terminal 200 according to the present invention.

When the second terminal 100 connected through short range communication makes a request for a control attempt in step S210, at least one of synchronization information and guide information corresponding to the reproduction operation (e.g. real-time broadcasting reproduction, VOD content reproduction, etc.) of the multimedia contents in the first terminal 200 may be provided to the second terminal 100 through short range communication in step S220 in the reproducing method of the first terminal 200 reproducing the multimedia contents according to the present invention.

Here, when the first terminal 200 reproduces real-time broadcasting contents, the synchronization information may contain current broadcasting channel information, information on real-time broadcasting contents which are being reproduced, and reproduction volume information. When the first terminal 200 reproduces VOD contents, the synchronization information may contain information on VOD contents which are being reproduced, reproduction section information, and reproduction volume information. As a result, the synchronization information may contain various information pieces required for synchronizing the second terminal 100 with the reproduction operation of the first terminal 200.

Further, in the reproducing method of the first terminal 200 according to the present invention, it is determined whether a predetermined control signal is received from the connected second terminal 100 through short range communication in step S230, and the reproduction operation of the multimedia contents is controlled according to the received control signal in step S240.

Meanwhile, when there is no request for the control attempt in step S210, it is determined whether the control signal is received from the outside, especially from the content service server 300 providing the multimedia contents in step S250 in the reproducing method of the first terminal 200 according to the present invention. At this time, it may be determined whether the control signal is received by extracting/recognizing the control signal including the multimedia contents provided/received from the content service server 300 in the reproducing method of the first terminal 200 according to the present invention.

As a result of the determination, when it is determined that the control signal has been received, the reproduction operation of the multimedia contents is controlled according to the received control signal in step S260 in the reproducing method of the first terminal 200 according to the present invention.

Figure 7:
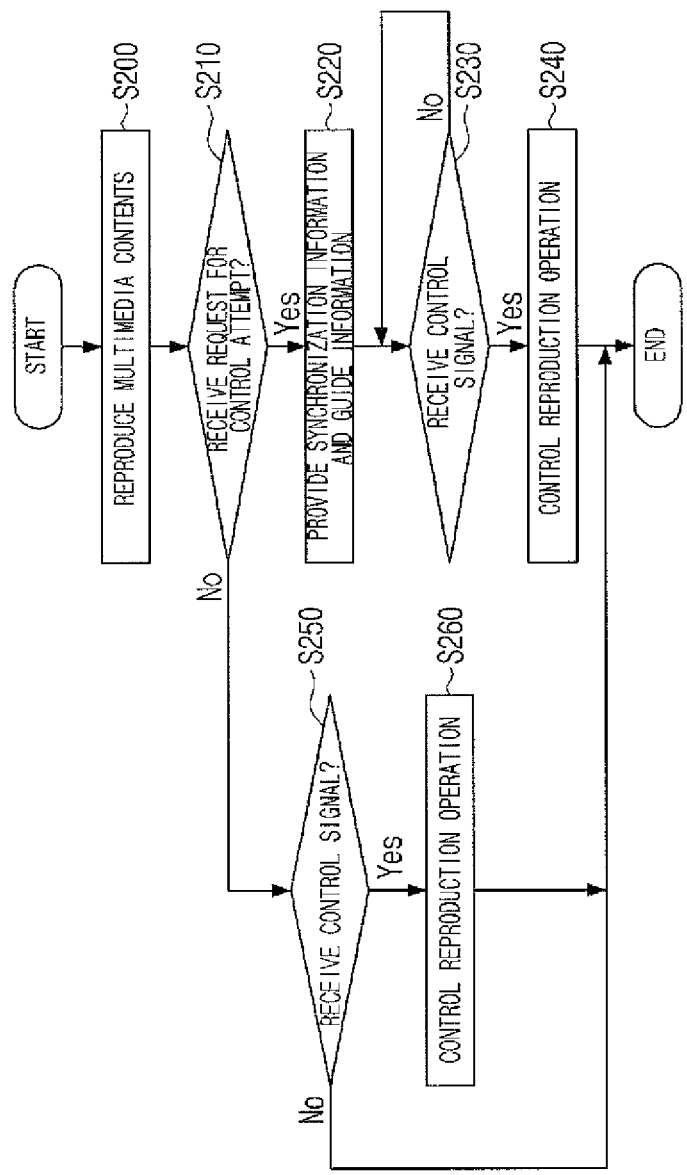
FIG. 7 is a flowchart illustrating a reproducing method of a first terminal according to exemplary embodiments of the present invention.

Meanwhile, although step S250 is performed after the determination in step S210 in FIG. 7, the process is only an embodiment of the present invention. The reproducing method of the first terminal 200 according to the present invention can perform in parallel step S230 of determining whether the control signal is received through short range communication and step S250 of determining whether the control signal is received from the content service server 300 after step S220 of providing the second terminal 100 of at least one of the synchronization information and the guide information through short range communication.

In the reproducing method of the first terminal 200 according to the present invention, the reproduction operation such as changing a broadcasting channel, adjusting a reproduction volume up/down, reproducing particular VOD content (e.g. movie 1), moving a reproduction section of the VOD contents (e.g. movie 1) which is being reproduced, or downloading particular VOD contents (e.g. movie 2) is performed.

Figure 8:
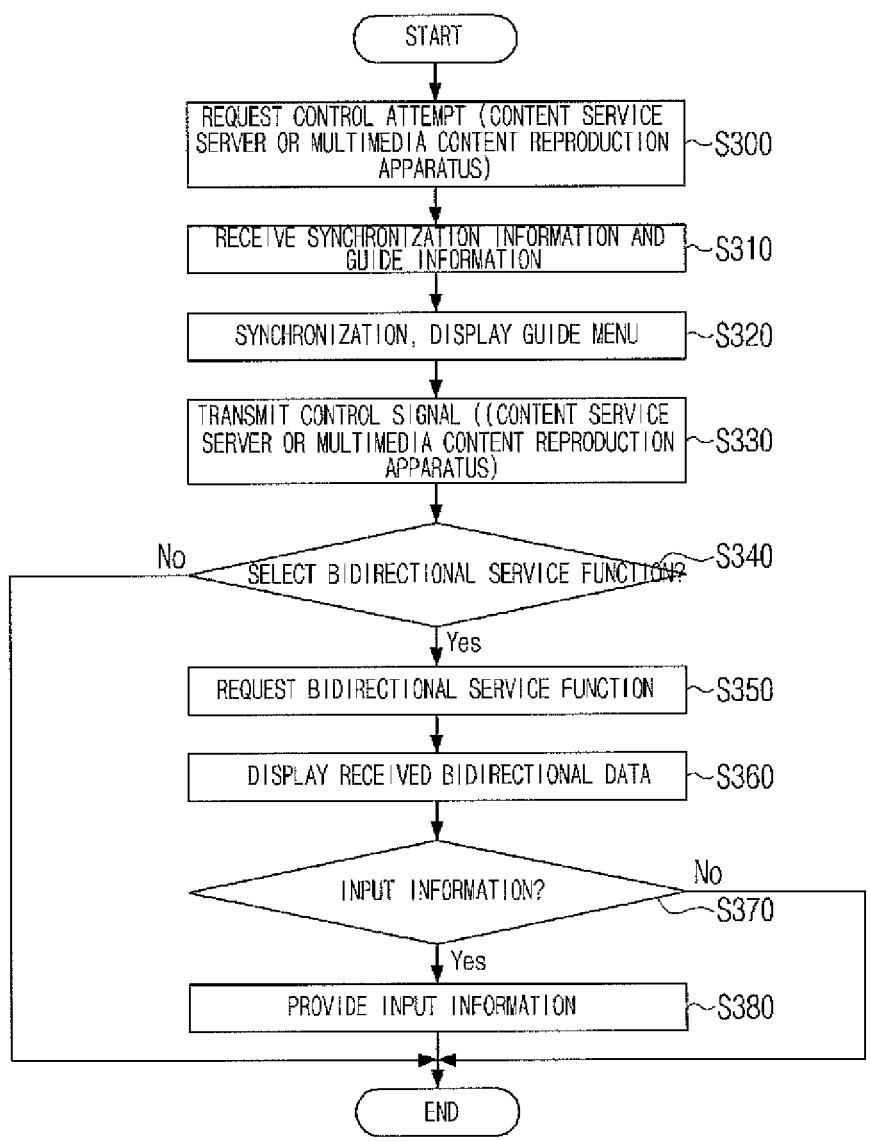
FIG. 8 is a flowchart illustrating a reproducing method of a second terminal according to exemplary embodiments of the present invention.

Hereinafter, a method of controlling the terminal according to the present invention will be described with reference to FIG. 8, and especially the second terminal 100 will be described for convenience of descriptions.

When the user inputs a control attempt for the first terminal 200, the control attempt for the first terminal 200 is requested in step S300 in the method of controlling the second terminal 100 according to the present invention.

Then, in the method of controlling the second terminal 100 according to the present invention, synchronization information and guide information according to the control attempt for the first terminal 200 are received in step S310.

For example, when the second terminal 100 is connected with the first terminal 200 through short range communication, the control attempt may be requested to the first terminal 200 in step S300, and synchronization information corresponding to the reproduction operation of the multimedia contents in the first terminal 200 may be received from the first terminal 200 according to the requested control attempt and guide information corresponding to the reproduction operation of the multimedia contents in the first terminal 200 may be received from the first terminal 200 or the predetermined external content service server 300 in step S310 in the method of controlling the second terminal 100 according to the present invention.

Alternatively, in the method of controlling the second terminal 100 according to the present invention, the control attempt for the first terminal 200 may be requested to the predetermined external content service server 300 in step S300 and the synchronization information and the guide information corresponding to the reproduction operation of the multimedia contents in the first terminal 200 are received from the content service server 300 according to the requested control attempt in step S310.

Accordingly, in the method of controlling the second terminal 100 according to the present invention, the second terminal 100 is synchronized with the reproduction operation of the multimedia contents in the first terminal 200 based on the synchronization information and a guide menu corresponding to the reproduction operation of the multimedia contents in the first terminal 200 may be displayed based on the guide information in step S320.

Here, the guide information contains EPG (Electronic Program Guide) information including broadcasting information on real-time broadcasting contents for each channel/time for the real-time broadcasting, information on various additional services, and detailed information on each real-time broadcasting content, information on lists of recommended contents, and detailed information on VOD contents including information on lists of VOD contents, thumbnail information for each VOD content, and popular area information. As a result, the guide information may contain various information pieces required for displaying the guide menu corresponding to the reproduction operation in the first to/urinal 200 by the second terminal 100.

In the method of controlling the second terminal 100 according to the present invention, when a remote control mode is selected according to a user's manipulation, the guide menu corresponding to the reproduction operation of the multimedia contents in the first terminal 200 may be displayed based on the guide information.

For example, when the remote control mode is selected, if the first terminal 200 reproduces the real-time broadcasting contents, an EPG screen for identifying the real-time broadcasting contents and a broadcasting channel which are currently being reproduced in the first terminal 200 is displayed as the guide menu based on the guide information, and detailed information on particular real-time broadcasting contents is displayed as the guide menu by converting the EPG screen according to the user's manipulation or lists of recommended contents are displayed as the guide menu. Of course, it is preferable that the guide menu contains displayed items for changing the broadcasting channel or adjusting the reproduction volume up/down.

Further, when the remote control mode is selected, if the first terminal 200 reproduces the VOD contents, a detailed screen for the VOD including a thumbnail for the VOD contents which are being reproduced in the first terminal 200, a popular area, control items of reproduction/pause/stop/rewind, and a progress bar for moving a reproduction section is displayed as the guide menu and lists of the VOD contents may be displayed as the guide menu by changing the detailed screen for the VOD according to the user's manipulation, the detailed information on the VOD contents may be displayed as the guide menu, or the EPG screen may be displayed as the guide menu based on the guide information in the method of controlling the second terminal 100.

As described above, when the manipulation by the user is made through the guide menu, a control signal corresponding to the first terminal 200 according to the user's manipulation is transmitted in step S330 in the method of controlling the second terminal 100.

For example, when a conversion of the broadcasting channel is selected in the guide menu (e.g. EPG screen), a control signal for making a request for the conversion to the selected broadcasting channel corresponding to the first terminal 200 may be provided in the method of controlling the second terminal 100. When a movement of the reproduction section is selected in the guide menu (e.g. detailed screen of VOD), a control signal for making a request for the movement to the selected reproduction section corresponding to the first terminal 200 may be provided in the method of controlling the second terminal 100.

Accordingly, the control signal transmitted in step S330 may be provided to the first terminal 200 through short range communication between the second terminal 100 and the first terminal 200.

Alternatively, the control signal transmitted in step S330 is provided to the content service server 300 and then the content service server 300 can provide the corresponding first terminal 200 with the control signal corresponding to the first terminal 200 transmitted from the second terminal 100 as described above.

Meanwhile, when a predetermined bidirectional service function is selected according to the user's manipulation in step S340, bidirectional data according to the selected bidirectional service function (e.g. viewing a review, viewing an advertisement, ordering an advertised product, etc.) corresponding to the multimedia contents (e.g. real-time broadcasting contents or VOD contents) reproduced in the first terminal 200 is requested to the content service server 300 and then the requested bidirectional data may be received/displayed in the method of controlling the second terminal 100 according to the present invention.

That is, when the predetermined bidirectional service function (e.g. viewing a review) is selected, the bidirectional data according to the bidirectional service function (e.g. viewing a review) corresponding to the multimedia contents (e.g. real-time broadcasting contents-sports broadcasting) reproduced in the first terminal 200 is requested to the corresponding content service server 300 in step S350, and accordingly the bidirectional data (e.g. information on the review) received from the content service server 300 may be displayed in step S360 in the method of controlling the second terminal 100. The user of the second terminal 100 can identify other viewers' opinions by viewing the review written by other viewers of the sports broadcasting reproduced in the first terminal 200 through the second terminal 100.

Further, input information input according to the user's manipulation is provided to the corresponding content service server 300 through the predetermined bidirectional function in the first terminal 200 through the second terminal 100.

That is, when the predetermined bidirectional service function (e.g. writing a review) is selected, the input information (e.g. review) is input by the user through the bidirectional service function (e.g. writing a review) corresponding to the multimedia contents (e.g. real-time broadcasting contents-sports broadcasting) reproduced in the first terminal 200 in step S370 and the input information (e.g. a review) may be provided to the content service server 300 through the communication interface unit 110 in step S380 in the first terminal 200 through the second terminal 100.

Figure 9:
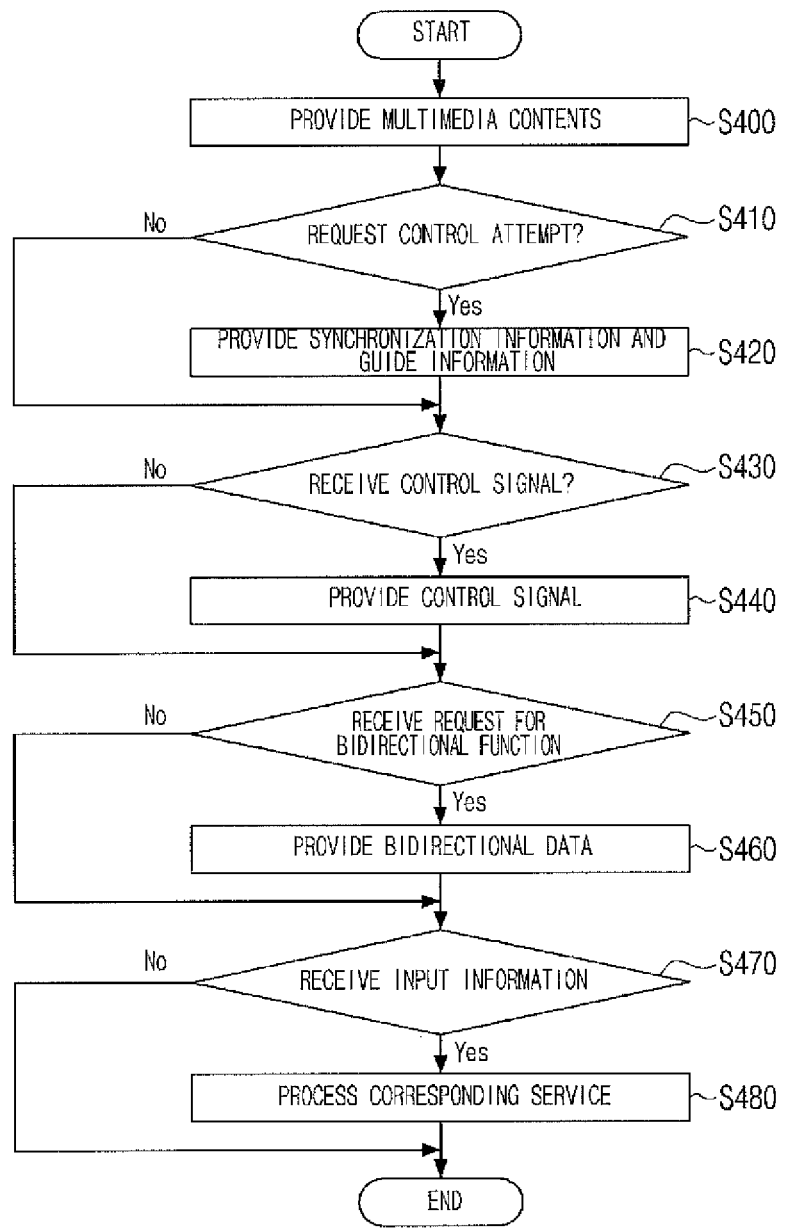
FIG. 9 is a flowchart illustrating a service method of a content service server according to exemplary embodiments of the present invention.

Hereinafter, a service method of the content service server 300 according to the present invention will be described with reference to FIG. 9.

In the service method of the content service server 300, at least one of multimedia contents (e.g. real-time broadcasting contents, VOD contents) are provided to the first terminal 200 in step S400. It is preferable that the guide information corresponding to the multimedia contents is also provided when the multimedia contents are provided.

Here, the guide information contains EPG (Electronic Program Guide) information including broadcasting information on real-time broadcasting contents for each channel/time for the real-time broadcasting, information on various additional services, and detailed information on each real-time broadcasting content, information on lists of recommended contents, and detailed information on VOD contents including information on lists of VOD contents, thumbnail information for each VOD content, and popular area information. As a result, the guide information may contain various information pieces required for displaying the guide menu corresponding to the reproduction operation in the first terminal 200 by the second terminal 100.

In the service method of the content service server 300, it is determined whether a request for an attempt at controlling the first terminal is received from the external second terminal 100 in step S410. When the request for the attempt at controlling the first terminal has been received, at least one of synchronization information and guide information corresponding to the reproduction operation of the multimedia contents in the first terminal 200 is provided to the second terminal 100 in step S420 in the service method of the content service server 300.

That is, in the service method of the content service server 300, when the second terminal 100 makes the request for the attempt at controlling the first terminal 200, the guide information required for providing the multimedia contents to the first terminal 200 is acquired and the synchronization information of the first terminal 200 is acquired through the communication with the first terminal 200. In the service method of the content service server 300, it is possible to provide the second terminal 100 with at least one of the synchronization information and the guide information corresponding to the reproduction operation of the multimedia contents in the first terminal 200.

Further, in the service method of the content service server 300, it is determined whether a control signal corresponding to the first terminal 200 is received from the second terminal 100 in step S430. When the control signal has been received, the corresponding control signal is provided to the second terminal 100 in step S440.

Meanwhile, in the service method of the content service server 300, when a predetermined bidirectional service function corresponding to the multimedia contents reproduced in the first terminal 200 is requested from the second terminal 100 in step S450, corresponding bidirectional data according to the requested bidirectional service function is provided to the second terminal 100 in step S460.

Specifically, in the service method of the content service server 300, the bidirectional data including at least one of content meta information containing at least one of information related to corresponding multimedia contents and information on pre-written reviews and detailed meta information containing at least one of advertisement information for each section or each scene of corresponding multimedia contents and information on reviews may be stored/managed in response to each of at least one of the multimedia contents.

In the service method of the content service server 300, when the second terminal 100 makes a request for the bidirectional service function (e.g. viewing a review, viewing an advertisement, ordering an advertised product, etc.) corresponding to the multimedia contents (e.g. real-time broadcasting contents or VOD contents) reproduced in the first terminal 200, bidirectional data (e.g. advertisement information) corresponding to corresponding multimedia contents (e.g. real-time broadcasting contents) according to the requested bidirectional service function (e.g. viewing an advertisement) is provided to the second terminal 100. Of course, in the service method of the content service server 300, the bidirectional data (e.g. advertisement information) corresponding to the corresponding multimedia contents (e.g. real-time broadcasting contents) according to the requested bidirectional service function (e.g. viewing an advertisement) may be also provided to the first terminal 200.

Further, in the service method of the content service server 300, when predetermined input information (e.g. watching a review) according to a predetermined bidirectional service function (e.g. writing a review) is received from the second terminal 100 in step S470, the corresponding service according to the corresponding bidirectional service function (e.g. writing a review) is processed based in the input information (e.g. watching a review) in step S480 in response to the multimedia contents (e.g. real-time broadcasting contents-sports broadcasting) reproduced in the first terminal 200. That is, in the service method of the content service server 300, other viewers can identify opinions written by users of the second terminal 100 for the corresponding sports broadcasting by registering the watching reviews provided from the second terminal 100 in the bidirectional data (content meta information and/or detailed meta information) corresponding to the corresponding multimedia contents (e.g. real-time broadcasting contents-sports broadcasting).

As described above, in the method of controlling the reproduction using the terminal according to the present invention, it is possible to control the reproduction operation of the first terminal 200 reproducing the multimedia contents by using the second terminal 100 having the communication interface by providing the control signal from the second terminal 100 to the first terminal 200 through the content service server 300 or directly providing the control signal from the second terminal 100 to the first terminal 200 through short range communication.

Further, in the method of controlling the reproduction using the terminal according to the present invention, it is possible to provide users with various bidirectional services and additional services corresponding to the multimedia contents reproduced in the first terminal 200 by using the second terminal 100.

Accordingly, in the method of controlling the reproduction using the terminal according to the present invention, it is possible to overcome a limitation in using a general TV remote control to provide an optimum control service and prevent a user's viewing from being interrupted by the displays of the bidirectional service and additional service in the reproduction apparatus, that is, the first terminal 200 by controlling the reproduction operation and supporting the bidirectional service using the second terminal 100 having the communication interface.

Although an exemplary embodiment of the present invention has been described for illustrative purposes, those skilled in the art will appreciate that various modifications, additions and substitutions are possible, without departing from the scope and spirit of the invention as disclosed in the accompanying claims.

INDUSTRIAL APPLICABILITY

When the system and method for controlling the reproduction using the terminal capable of overcoming a limitation in using a general TV remote control to provide an optimum control service is applied by controlling the reproduction operation and supporting the bidirectional service using the second terminal 100 having the communication interface, it is possible to achieve progress in improving an environment for controlling the reproduction apparatus and an environment of watching multimedia contents, and satisfying users without the burden of costs for establishing a service. Further, the present invention has great potential in commercialization of the second terminal, the first terminal, the content service server, and service solutions and thus has the realistic possibility.

What is claimed is:

1. A content service server which communicates with a first terminal for reproducing multimedia contents and communicates with
    a second terminal without reproducing the multimedia contents for providing a bidirectional data corresponding to the multimedia contents being reproduced in the first terminal,
    the content server comprising:
    content provision manager for providing the multimedia contents to the first terminal;
    a control interworking unit for
    receiving a request for an attempt at controlling the first terminal from the second terminal communicating with the first terminal through short range communication network,
    acquiring a guide information and synchronization information corresponding to the reproduction operation of the multimedia contents in the first terminal,
    providing the acquired guide information and synchronization information to the second terminal,
    a bidirectional service manager for
    receiving an input associated with a predetermined bidirectional service function corresponding to the multimedia contents according to a user's manipulation through a guide menu based on the guide information, wherein the second terminal is synchronized with the reproduction operation of the multimedia contents in the first terminal based on the synchronization information and displayed guide menu,
    being reproduced in the first terminal from the second terminal, generating a bidirectional data according to the predetermined bidirectional service function, and
    for user checking the bidirectional data while the multimedia contents are being reproduced by the first terminal, including reviews corresponding to each section or each scene of the multimedia contents written by other viewers.

2. The content service server as of claim 1, wherein
    the control interworking unit for receiving a control signal for the multimedia contents from the second terminal and then transmitting the received control signal to the first terminal.

3. A service method of a content service server which communicates with a first terminal for reproducing multimedia contents and communicates with a second terminal without reproducing the multimedia contents for providing a bidirectional data corresponding to the multimedia contents being reproduced in the first terminal, the method comprising:
- providing the multimedia contents to the first terminal;
- receiving a request for an attempt at controlling the first terminal from the second terminal communication with the first terminal through short range communication network,
- acquiring a guide information and synchronization information corresponding to the reproduction operation of the multimedia contents in the first terminal;
- providing the guide information and synchronization information to the second terminal;
- receiving an input associated with a predetermined bidirectional service function corresponding to the multimedia contents according to a user's manipulation through a guide menu based on the guide information, wherein the second terminal is synchronized with the reproduction operation of the multimedia contents in the first terminal based on the synchronization information and displayed the guide menu,
- generating a bidirectional data according to the predetermined bidirectional service function; and
- for user checking the bidirectional data while the multimedia contents are being reproduced by the first terminal, including reviews corresponding to each section or each scene of the multimedia contents written by other viewers.

4. The method of claim 3, further comprising:
- receiving a control signal for the multimedia contents from the second terminal; and
- transmitting the received control signal to the first terminal.

* * * * *